United States Patent

Sattler

[15] 3,683,329

[45] Aug. 8, 1972

[54] BRAKE SIGNAL CIRCUIT

[72] Inventor: Gernot Sattler, Mauerbachstrasse 38/2/4, A-1147 Vienna, Austria

[22] Filed: Sept. 8, 1969

[21] Appl. No.: 856,012

[30] Foreign Application Priority Data

Sept. 11, 1968   Austria ................. A 8852/68

[52] U.S. Cl. ............................. 340/71, 310/15
[51] Int. Cl. ............................................ B60q 1/44
[58] Field of Search ..................... 340/71; 310/15

[56] References Cited

UNITED STATES PATENTS

| | | | |
|---|---|---|---|
| 1,676,412 | 7/1928 | Pervier | 340/71 |
| 3,214,732 | 10/1965 | Young | 340/78 |
| 3,336,575 | 8/1967 | Lundahl | 340/72 |
| 3,492,638 | 1/1970 | Lane | 340/66 |
| 2,119,811 | 6/1938 | Green | 310/15 |
| 2,156,751 | 5/1934 | Collins | 340/71 UX |
| 2,283,277 | 5/1942 | Modine | 310/15 X |
| 2,820,411 | 1/1958 | Park | 310/15 X |
| 3,304,381 | 2/1967 | McAnespey | 340/71 UX |
| 3,559,788 | 2/1971 | Jensen et al. | 310/15 X |

FOREIGN PATENTS OR APPLICATIONS

| | | | |
|---|---|---|---|
| 387,941 | 2/1933 | Great Britain | 340/71 |

*Primary Examiner*—Kenneth N. Leimer
*Attorney*—Marn & Jangarathis

[57] ABSTRACT

Apparatus for displaying a warning signal such as a light or horn in response to the sudden operation of the brake pedal of a vehicle. Sudden depression of the brake pedal of a vehicle causes the induction of a current in a switching circuit which causes actuation of a warning device. Means are provided to maintain the warning device actuated until depression of the brake pedal is terminated.

6 Claims, 1 Drawing Figure

PATENTED AUG 8 1972
3,683,329
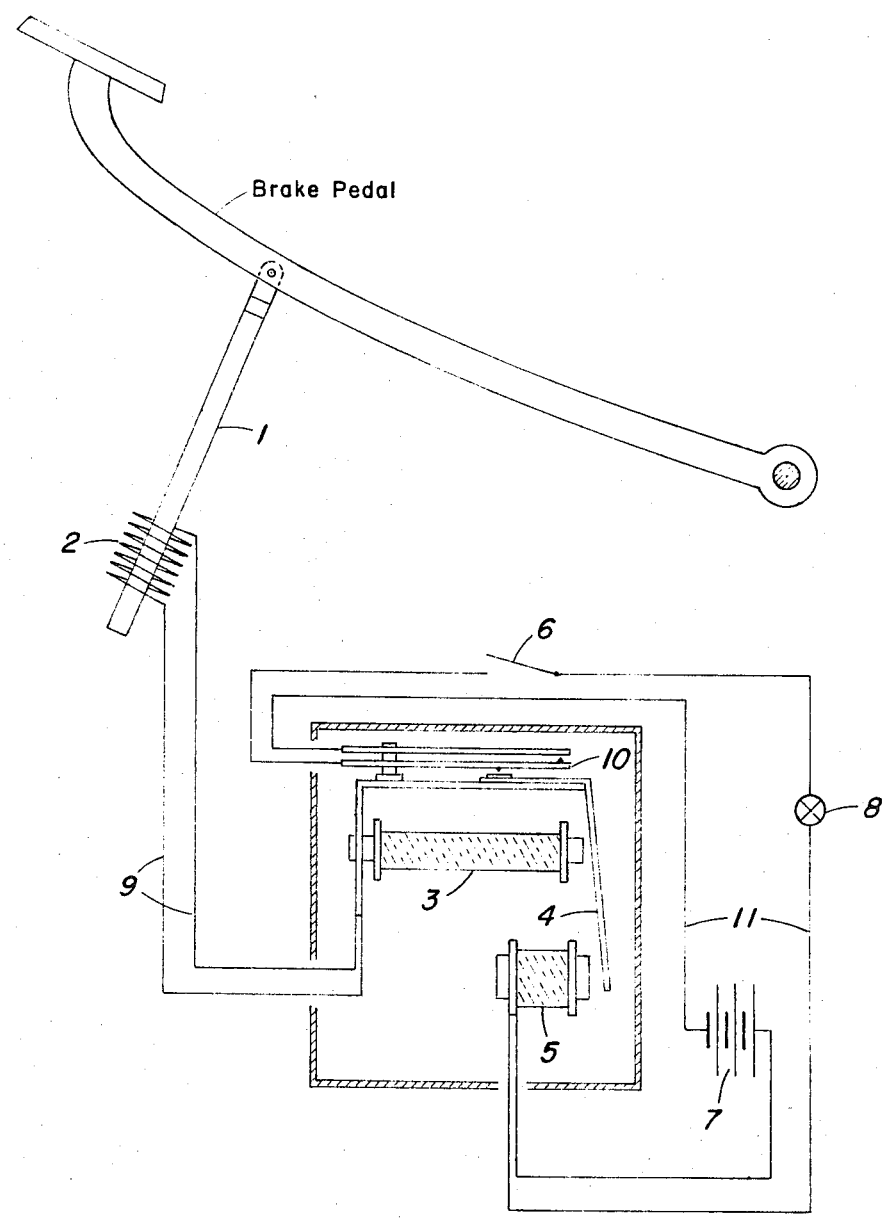

BRAKE SIGNAL CIRCUIT

BACKGROUND OF THE INVENTION

This invention relates to safety devices and in particular to devices for use in vehicles such as automobiles to provide a warning signal during emergency braking.

A primary cause of damage to property and injury to passengers in motor vehicles is the rear end hit auto accident. In many such accidents the driver of a following vehicle may not notice sudden braking by the driver of a leading vehicle and as a result, he may not brake his vehicle sufficiently quickly to avoid hitting the rear end of the leading vehicle. The incidence of such accidents increases at high speeds and under poor visibility conditions.

SUMMARY OF THE INVENTION

It is the principal object of the invention, therefore, to provide a warning signal such as a light and/or horn which will be actuated in response to the occurrence of emergency braking procedures by the driver of an auto.

This object is accomplished by the apparatus of the invention which may include a warning signal and means responsive to the rate at which braking force is applied to actuate the warning signal.

BRIEF DESCRIPTION OF THE DRAWING

A more complete understanding of the invention may be had from the following detailed description thereof when read in the light of the accompanying drawing wherein:

the FIGURE is a schematic presentation of an operating circuit according to the invention.

DETAILED DESCRIPTION

Referring to the drawing, there is shown the pivoted foot brake of an auto which foot brake has attached to its pivot arm a rod 1 manufactured from permanent magnetic material. Rod 1 extends through a coil 2, which coil is electrically connected by conductors 9 to a relay 3. Pivotally mounted on relay 3 is a contact arm 4 which may be drawn from a position displaced from relay 3 as shown in the drawing, to a position in contact with relay 3 (not shown) when the relay is actuated by the rapid depression of the brake pedal as is discussed below in detail. The end of contact arm 4 remote from relay 3 defines an actuator for making and breaking a switch 10 in a warning signal alarm circuit.

Warning signal alarm circuit 11 includes the relay operated switch 10, a switch 6 operated between make and break positions by the depression of the brake pedal, which switch may be the regular brake light switch of the auto, a warning signal device 8 which may be a light, horn or other warning signal, an electromagnet 5 positioned adjacent relay 3 to retain contact arm 4 in actuated position so long as current is flowing in the warning signal alarm circuit and a source of electrical power 7 which may be the usual automobile battery.

Operation of the warning signal alarm of the invention occurs as follows. If the driver of an automobile applied sudden braking force to the brake pedal, magnetic arm 1 is displaced at a high rate through coil 2 thereby inducing a current which actuates relay 3 to rotate contact arm 4 in a clockwise direction as shown in the drawing. Additionally, the depression of the brake pedal closes switch 6.

If contact arm 4 is rotated clockwise sufficiently to cause the making of the warning signal alarm circuit 11 current flows through the warning signal alarm circuit causing actuation of the alarm. Once current commences flowing through the warning signal alarm circuit, electromagnet 5 is actuated to retain contact arm 4 in its clockwise, displaced position. When the driver releases the brake pedal, switch 6 is opened, electromagnet 5 is deactuated and contact arm 4 rotates in a counterclockwise direction to break the contact of the warning signal alarm switch 10. It can be seen therefore that the apparatus of the invention is simple, provides for the actuation of a supplementary alarm circuit only in the event of sudden braking and the deactivation of the supplemental alarm upon release of the brake pedal.

The coils, relays, switches and other apparatus necessary to structure a warning signal alarm according to the invention are conventional and commercially available. The amount of induced current necessary to actuate the alarm circuit is dependent upon the characteristics of relay 3 and coil 2, which characteristics may be provided for by one having ordinary skill in the art with known techniques.

It is manifest that many modifications and variations of the structure of the disclosed embodiment may be made without departing from the spirit and scope of the invention.

What is claimed is:

1. Apparatus for displaying a warning signal in response to the sudden operation of the brake pedal of an auto, comprising:
    an inductance coil for inducing a current flow therein proportional to the rate of change of magnetic flux threading said inductance coil;
    a magnet secured to said brake pedal and extending through said inductance coil to provide magnetic flux threading said inductance coil such that operation of said brake pedal alters the relative position of said magnet, thereby changing the magnetic flux threading said inductance coil;
    an electrically activated signal means; and
    a relay connected to said inductance coil and responsive to the current induced in said inductance coil for completing an alarm signal circuit to provide electric power to said signal means in accordance with the current induced in said inductance coil.

2. Apparatus according to claim 1 wherein said relay includes a rotatable connector arm for operating an alarm signal switch in said alarm signal circuit, and wherein said alarm signal circuit includes:
    retaining means responsive to the passage of current through said alarm signal circuit for maintaining said rotatable connector arm in position for closing said alarm signal switch.

3. Apparatus according to claim 2 wherein said retaining means is an electromagnet.

4. Apparatus according to claim 2 wherein said alarm signal circuit includes series connected line switch means responsive to the depression of said brake pedal such that release of said brake pedal opens sail line switch means to interrupt said alarm signal circuit.

5. Apparatus according to claim 4 wherein said signal means is a light.

6. Apparatus according to claim 4 wherein said signal means is a horn.

* * * * *